United States Patent Office 3,530,568
Patented Sept. 29, 1970

1

3,530,568
DIFFUSION WELDING OF THE NICKEL-BASE
SUPERALLOYS
William A. Owczarski, Cheshire, Conn., William H. King,
Seattle, Wash., and David Scott Duvall, Middletown,
Conn., assignors to United Aircraft Corporation, East
Hartford, Conn., a corporation of Delaware
Filed Apr. 24, 1969, Ser. No. 819,063
Int. Cl. B23k 31/02, 35/24
U.S. Cl. 29—498                                10 Claims

ABSTRACT OF THE DISCLOSURE

The nickel-base superalloys are joined together in a process wherein the mating surfaces are plated with nickel or a nickel-cobalt alloy and diffusion welded at high temperature.

BACKGROUND OF THE INVENTION

The present invention relates in general to diffusion welding and, more particuarly, to the diffusion welding of the nickel-base superalloys.

The performance criteria demanded of today's advanced gas turbine engines have exceeded the capabilities of the available alloys and have caused resort to internally cooled components of complex geometry. Because of the complexity of configuration, the various components are extremely difficult to produce by conventional manufacturing techniques or at least prohibitively expensive when so produced. One solution to the problem is to produce the components in fabricable sections and subsequently to join the sections together to form the desired component. A joining process which is well suited to such fabrication processes is diffusion welding.

Diffusion welding as a manufacturing process is well known as evidenced, for example, by the patent to Keeleric 3,327,382. In a typical process of this type the two surfaces to be joined are held together under pressure at high temperature until the desired joint is effected through a solid state diffusion mechanism.

Diffusion welding has several advantageous features. It permits the joining of complex configurations without melting of the substrate materials and without unpredictable distortion of the parts or the assembly. Furthermore, by proper processing, it is often possible to provide a bonding zone whose metallurgical appearance and microstructure are virtually indistinguishable from the parent metal of the adjacent joint areas. As a result, the mechanical and physical properties of the properly-made joints may frequently be made to approach or equal those of the parent metal.

Some work has been reported in the diffusion welding of the precipitation-hardenable, nickel-base superalloys as reported in an article entitled "Diffusion Bonding and Pressure Brazing of Nimonic 90 Nickel-Chromium-Cobalt Alloy," British Welding Journal 9(3), pp. 139–148 (1962). The authors found that joints made with a thin nickel interlayer at the mating surfaces had better properties than diffusion welds made without the interlayer. Butt joints made with an interlayer 0.001 inch thick had room temperature strengths 95 percent and ductilities 50 percent that of the parent metal. In stress-rupture, however, these joints had a calculated efficiency of about 25–50 percent.

In general, the prior art techniques have resulted in joints which do not, in terms of their mechanical properties, represent the full capability of the diffusion-welding processes. Furthermore, the nickel-base alloys examined usually were characterized by low aluminum plus titanium contents, 3.8 percent for Nimonic 90, for example. The alloys used in the advanced gas turbine engine components typically are characterized by higher aluminum and titanium contents, and these elements are known to adversely affect diffusion welding response. Representative of these more advanced nickel-base alloys of the γ-γ' type are those identified as follows:

| Alloy | Typical γ' solvus (° F.) | Nominal Composition (by weight) |
|---|---|---|
| Udimet 700 | 2,100 | 15% Cr, 18.5% Co, 3.25% Ti, 4.25% Al, 5% Mo, .1% C, .03% B, bal. Ni. |
| IN | 2,200 | 10% Cr, 15% Co, 4.5% Ti, 5.5% Al, 3% Mo, .17% C, .75% V, .015% B, .015% Zr, bal. Ni. |
| MAR M200 | 2,250 | 9% Cr, 10% Co, 2% Ti, 5% Al, .15% C, 12.5% W, 1% Cb, .015% B, .05% Zr, bal. Ni. |
| B-1900 | 1,975 | 8% Cr, 10% Co, 1% Ti, 6% Al, 6% Mo, .11% C, 4.3% Ta, .15% B, .07% Zr, bal. Ni. |

SUMMARY OF THE INVENTION

This invention relates to the diffusion welding of the nickel-base superalloys utilizing a thin layer of nickel or a nickel-cobalt alloy at the weld joint. In the preferred process, the surfaces to be joined are plated with a nickel-base alloy containing 20–50 weight percent cobalt, positioned in intimate contact, and diffusion bonded together at a temperature exceeding the superalloy γ' solvus temperature.

DESCRIPTION OF THE PREFERRED
EMBODIMENTS

Specimens of wrought Udimet 700 were machined from ⅝ inch diameter hot rolled barstock while cast samples were taken from ⅝ inch diameter as-cast bars. The wrought specimens were bonded in either the as-received, mill-annealed condition or after solution heat treatment, while the cast specimens were joined in either the as-cast or solution heat treated condition.

The actual composition of the above alloys was as follows:

TABLE I

| Element, wt. percent | Wrought Udimet 700 | Cast Udimet 700 |
|---|---|---|
| Nickel | Balance | Balance |
| Chromium | 15.1 | 14.7 |
| Molybdenum | 4.95 | 4.15 |
| Cobalt | 18.7 | 15.2 |
| Aluminum | 4.5 | 4.3 |
| Titanium | 3.4 | 3.4 |
| Carbon | 0.06 | 0.07 |
| Boron | 0.014 | 0.014 |
| Zirconium | 0.05 | 0.04 |

The standard heat treatments utilized are set forth in Table II.

TABLE II

| Heat Treatment (argon) | Wrought Udimet 700 | Cast Udimet 700 |
|---|---|---|
| Solution | 2,140° F./4 hours/forced air cool (FAC). | 2,125° F./2 hours/FAC. |
| Post weld, full heat treatment. | 1,975° F./4 hours/Fac+1,550°F./4 hours/FAC+1,400° F./16 hours/FAC. | 2,125° F./15 min., cool at 100 °/hr. to 1,975° F./4 hours/FAC+1,400° F./16 hours/FAC. |

Prior to diffusion welding, the surfaces to be joined were ground flat and parallel and polished with a 600 grit metallographic paper. Immediately prior to bonding, the mating surfaces were degreased with acetone, rinsed with methanol and blown dry with Freon.

The initial diffusion welds were made without any interlayer at the joint. The bonding parameters were 2140° F. under 1000 p.s.i. compression for 4 hours.

Figure 1:
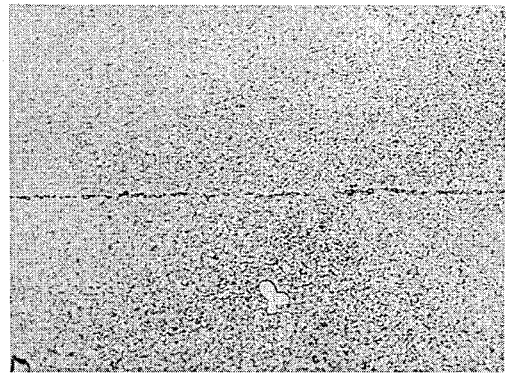
FIG. 1 is a photomicrograph of a diffusion bonded joint formed between two wrought Udimet 700 alloy parts joined without an interlayer. (1000× before reduction.)

As may be seen by reference to FIG. 1, the interfacial grain boundary in the joints made without an interlayer remained planar and immobile. Close metallographic examination revealed that the grain boundaries were pinned by a row of very fine precipitates resulting from a reaction between elements in the base metal and residual surface contamination. It was shown that diffusion welds containing a precipitate-laden planar joint have poor mechanical properties. In fact, most joints made in this fashion broke apart during attempts to machine tensile specimens.

Figure 2:
FIG. 2 is a photomicrograph of an alloy sample similar to that of FIG. 1 bonded with a nickel interlayer (550× before reduction.)

The use of a nickel interlayer at the mating surfaces was found to be beneficial in reducing the precipitate formation. The mating surfaces were electroplated with nickel from a nickel sulfamate bath and then bonded with the parameters described previously. An evaluation of the effects of interlayer thickness revealed that very thin thicknesses on the order of 5 microns (2.5 microns on each surface) provided the optimum results. At this thickness, as seen in FIG. 2, there was little or no interfacial precipitate formation during the welding sequence and the interfacial grain boundaries in the wrought specimens were able to migrate freely out of the original joint plate. Joints made with very much thinner nickel interlayers, on the order of 2 microns total thickness, failed to effectively suppress the interfacial precipitate formation. However, nickel interlayers of substantially greater thickness, over about 10 microns, increased the chemical and microstructural heterogeneity remaining at the joint after bonding and full heat treatment.

Electron probe analysis across the interface indicates slightly higher nickel concentration and lower molybdenum, chromium and cobalt at the joint than in the parent metal. Contrary to the expected diffusional behavior, however, the aluminum and titanium concentrations at the joint were higher than in the base metal alloy.

It was found that joints made at temperatures below the gamma prime ($\gamma'$) typically the intermetallic compound $Ni_3$ (Al,Ti) solvus temperature resulted in the production of a coarse $\gamma'$ layer at the joint together with adjacent regions depleted in aluminum and titanium and, hence, depleted in $\gamma'$. The $\gamma'$ layer also served to immobilize the interfacial grain boundary. This $\gamma'$ layer is extremely detrimental to mechanical properties.

Under laboratory conditions, reasonably good diffusion welds were achieved in the high aluminum/titanium nickel-base superalloys through the use of the very thin nickel interlayer. However, the system is insensitive to the formation of the layered intermetallic at the joint, and the bonding temperature sensitivity is even greater in the cast alloys because the inherent chemical segregation in the cast material produces local regions characterized by abnormally high $\gamma'$ solvus temperatures.

Figure 3:
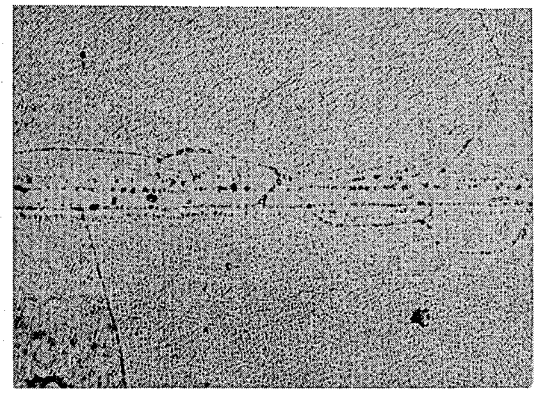
FIG. 3 is a photomicrograph of a joint similar to that of FIG. 2 bonded with a cobalt interlayer and thereafter fully heat treated. (750× before reduction.)

It is known that cobalt strongly influences the $\gamma'$ solvus temperature in the nickel-base superalloys. Diffusion welded joints were made with a cobalt interlayer at a thickness of 5 microns using the wrought Udimet 700 material. Bonding temperatures both above (2140° F.) and below the $\gamma'$ solvus temperature (200° F.) were utilized. As indicated in FIG. 3, the cobalt interlayer depressed the $\gamma'$ solution temperature and prevented the interfacial $\gamma'$ layer formation even at 2000° F. However, the cobalt also prevented the desired precipitation during the post-weld aging heat treatment.

Figure 4:
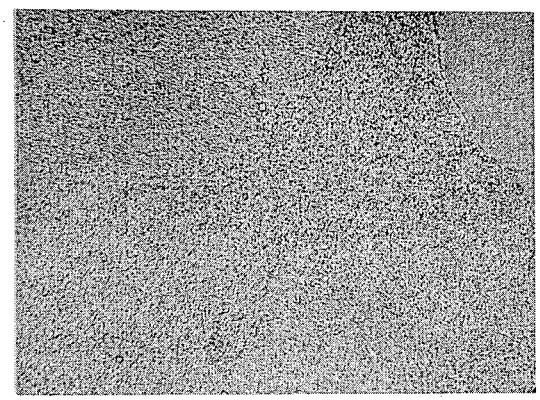
FIG. 4 is a photomicrograph of a wrought Udimet 700 alloy diffusion welded with a nickel-cobalt alloy interlayer and thereafter fully heat treated. As in the prior photomicrograph the joint extends horizontally in the figure. (250×before reduction.)

The ideal interlayer material is a nickel-cobalt alloy. Cobalt additions up to about 20 weight percent in the alloy progressively raise the $\gamma'$ solvus temperature, however above about 20 percent increases in the cobalt content substantially decrease the $\gamma'$ solvus. At the higher cobalt concentrations, above about 35 weight percent cobalt, although the $\gamma'$ solvus temperature is reduced as desired, increasing difficulty is encountered in providing the desired precipitation during aging. Above about 50 weight percent cobalt, the cobalt addition is detrimental because of the extent to which $\gamma'$ precipitation is prevented during aging. In the optimum range of about 25-35 weight percent cobalt, the nickel-base alloy was found to be particularly effective in preventing the $\gamma'$ layer formation during the welding sequence without upsetting the normal $\gamma'$ precipitation at the joint area during post weld heat treatment. As shown in FIG. 4, the use of the nickel-cobalt alloy interlayer resulted in a joint of great homogeneity, both chemically and microstructurally. In fact, the joint location cannot be distinguished from the areas of the parent metal.

Diffusion welds made utilizing a foil at the interface instead of the preferred plating were generally unsatisfactory as the undesirable precipitates formed at the foil-substrate interface during bonding. Accordingly, plating is the preferred method of providing the interface material.

Any number of methods are available for plating or coating the surfaces to be joined. The surfaces may be coated by vacuum vapor deposition methods such as shown in the patent to Steigerwald 2,746,420 wherein electron beam melting is employed. Coatings made by electroplating methods have been found satisfactory.

A number of tests were performed concurrently with the metallographic examinations to ascertain the mechanical properties of the bonded materials. All creep rupture tests were performed at 1400° F. and 85 K s.i. stress. The results are summarized in Table III.

TABLE III.—CREEP RUPTURE OF DIFFUSION WELDED MATERIALS

| Sample | Base metal Type | Inter-layer | Process Schedule [1] | Rupture Life (hrs.) | Percent Elongation | Percent Reduction of Area | Failure Location | Estimated Joint Efficiency,[2] Percent |
|---|---|---|---|---|---|---|---|---|
| 1 | Wrought | None | A | No. Test—Failed at Joint During Machining | | | | |
| 2 | do | do | A | 6.2 | 1.9 | 2.6 | Joint | 86 |
| 3 | do | Ni | A | 14.1 | 2.8 | 2.2 | Joint Vicinity | 92 |
| 4 | do | Ni | A | 9.8 | 2.4 | 3.0 | do | 88 |
| Base Metal | | | | 40 | 5 | | | |
| 5 | Cast | Ni | B | 37.8 | 4.8 | 16.0 | Base Metal | >100 |
| 6 | do | Ni | B | 4.7 | 2.0 | 1.8 | Joint Vicinity | 90 |
| 7 | do | Ni | B | 8.9 | 2.0 | 5.0 | do | 93 |
| 8 | do | Ni | B | 19.2 | 2.0 | 3.0 | do | 99 |
| 9 | do | Ni | C | 23.1 | | | do | 100 |
| 10 | do | Ni | C | 9.0 | | | do | 93 |
| 11 | do | Ni | C | 21.8 | | | do | 99 |
| 12 | do | Ni | C | 4.2 | | | do | 90 |
| 13 | do | Ni-35Co | D | 13.3 | 0.9 | 4.6 | do | 97 |
| 14 | do | Ni-35Co | D | 12.6 | 0.9 | 3.8 | do | 97 |
| Base Metal | | | | 23 | 4 | | | |

[1] Schedule A = Soln. H.T. plus bond at 2,140° F./3 hrs./1 K s.i. plus 2,140° F./1 hr. plus remaining Full H.T.; Schedule B = 2,140° F./4 hrs. plus bond at 2,140° F./3 hrs./1 K s.i. plus 2,125° F./15 min. plus remaining Full H.T.; Schedule C = As cast plus bond at 2,140° F./3 hrs./1 K s.i. plus 2,125° F./15 min. plus remaining Full H.T.; Schedule D = As cast plus bond at 2,140° F./8 hrs./1 Ks.i. plus 2,125° F./15 min. plus remaining Full H.T.
[2] Determined from estimate of reduction of stress necessary to increase failure time of sample in question to specification requirements.

It was found that satisfactory bonds could be made between nickel-base superalloys of high aluminum/titanium content provided that an interlayer material was utilized and provided further that the thickness of the interlayer and the conditions of bonding were carefully regulated. Elemental nickel as the interlayer material generally resulted in joints having a composition after heat treatment close to that of the base metal. However, the slight compositional difference which did exist altered the $\gamma'$ morphology and distribution especially in the cast material. Furthermore, use of elemental nickel tended to render the proces parameter sensitive.

The use of a nickel-cobalt alloy interlayer at a composition containing about 20–50 weight percent cobalt, preferably 25–35 percent cobalt, balance essentially nickel, improved the chemical and microstructural homogeneity of the diffusion-welded joint and removed the sensitivity of the system to slight variations in processing conditions, resulting in less scatter in properties in joints made under the same nominal conditions.

In terms of processing parameters and speaking somewhat generally inasmuch as some variation is expected dependent upon the base metal composition, the use of an interlayer thickness of about 3–9 microns, a bonding pressure of 1000–5000 p.s.i., a temperature of 1125°–1200° C., and a time factor of about 4–6 hours is representative.

Although the invention has been described in connection with certain examples and preferred embodiments, these are intended to be illustrative only. The invention in its broader aspects is not limited to the exact details described, for obvious modifications will occur to those skilled in the art.

What is claimed is:

1. A process for fabricating components from the nickel-base superalloys of the $\gamma$–$\gamma'$ type having a combined aluminum/titanium content in excess of about 6 weight percent which comprises:
   coating each of the surfaces to be joined with nickel containing up to 50 weight percent cobalt to a thickness of 0.00003–0.0001 inch;
   positioning the coated surfaces in intimate contact; and diffusion bonding the surfaces together at a temperature exceeding the superalloy $\gamma'$ solvus temperature.

2. In the diffusion welding of the nickel-base superalloys having a combined aluminum/titanium content in excess of about 6 weight percent, the improvement which comprises:
   providing the surfaces to be joined with an interface material consisting of a nickel-base alloy containing 20–50 weight percent cobalt.

3. The improvement according to claim 2 wherein: the nickel-base alloy contains 25–35 weight percent cobalt.

4. The improvement according to claim 3 wherein: the combined thickness of the interface material is about .00005–0003 inch.

5. The improvement according to claim 4 wherein: the combined thickness of the interlayer material is about .0001 inch.

6. A process for fabricating components from the nickel-base superalloys having a combined aluminum/titanium content in excess of about 6 weight percent which comprises:
   coating each of the surfaces to be joined with an alloy consisting esentially of 20–50 weight percent cobalt, balance nickel to a thickness of about 0.00003–0.0002 inch;
   and diffusion bonding the surfaces together.

7. The process according to claim 6 wherein: the coating alloy consists essentially of 25–35 weight percent cobalt, balance nickel.

8. A diffusion welding process for joining the nickel-base superalloys which comprises:
   coating each of the surfaces to be joined with an alloy consisting essentially of 20–50 weight percent cobalt, balance nickel;
   assembling the superalloys with the surfaces to be joined in intimate contact;
   and heating the assembled superalloys at a temperature of 1125–1200° C. for a period of 2–6 hours.

9. The process according to claim 8 wherein: each of the surfaces to be joined is coated to a thickness of about 0.00003–0.0001 inch.

10. The process according to claim 9 wherein: the surfaces to be joined are subjected to a compressive pressure of 1000–5000 p.s.i.

References Cited

UNITED STATES PATENTS

| 3,094,414 | 6/1963 | Franklin et al. | 29—498 X |
| 3,108,861 | 10/1963 | Cape | 29—504 X |
| 3,145,466 | 8/1964 | Feduska | 29—504 X |
| 3,188,732 | 6/1965 | Feduska et al. | 29—504 X |
| 3,197,858 | 8/1965 | Feduska et al. | 29—504 X |

OTHER REFERENCES

Kaarlela et al., "Alloy Effects in the Low-Pressure Diffusion Bonding of Superalloys," Welding Journal, June 1967, pp. 283–5 to 288–5.

RONALD J. SHORE, Assistant Examiner

J. E. CAMPBELL, Primary Examiner

U.S. Cl. X.R.

29—504

PO-1050
(5/69)

UNITED STATES PATENT OFFICE
CERTIFICATE OF CORRECTION

Patent No. 3,530,568      Dated September 29, 1970

Inventor(s) WILLIAM A. OWCZARSKI ET AL

It is certified that error appears in the above-identified patent and that said Letters Patent are hereby corrected as shown below:

In claim 4, line 3, 0003 should appear as .0003.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents